Jan. 7, 1930.                T. BORGAN                 1,743,020
                         AIRPLANE CONSTRUCTION
                         Filed Jan. 23, 1929          2 Sheets-Sheet 1
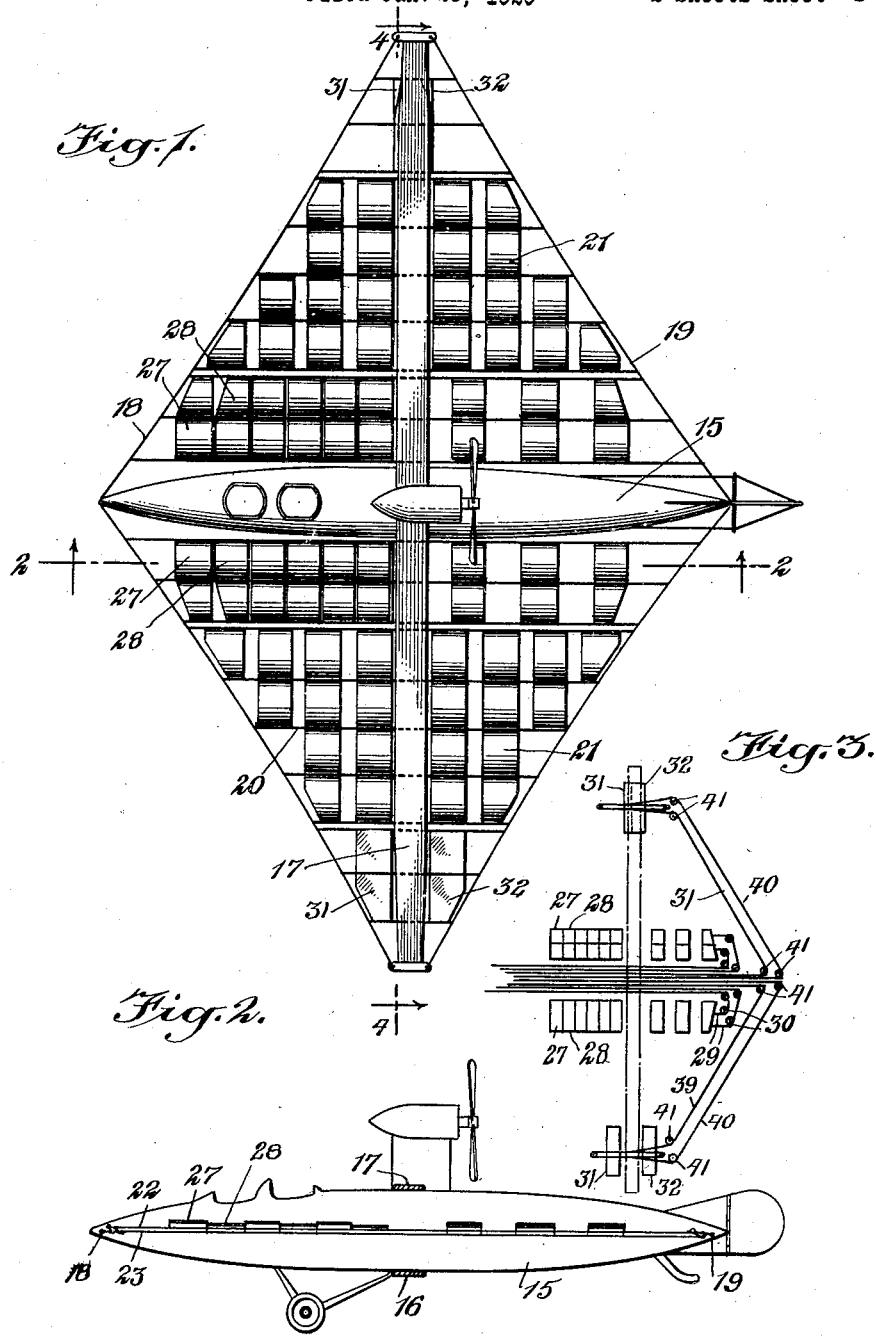
WITNESSES                                      INVENTOR
                                            Thoralf Borgan
                                               BY
                                                    ATTORNEY Jan. 7, 1930.  T. BORGAN  1,743,020
AIRPLANE CONSTRUCTION
Filed Jan. 23, 1929  2 Sheets-Sheet 2
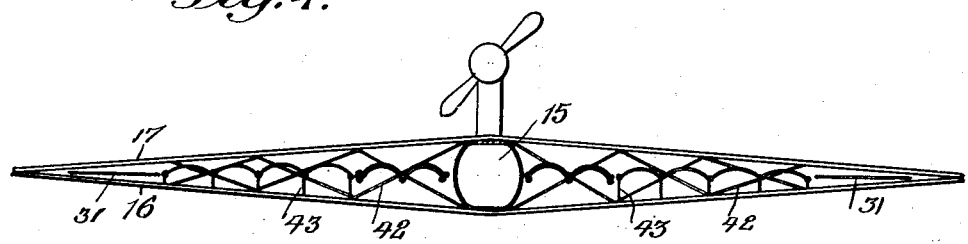
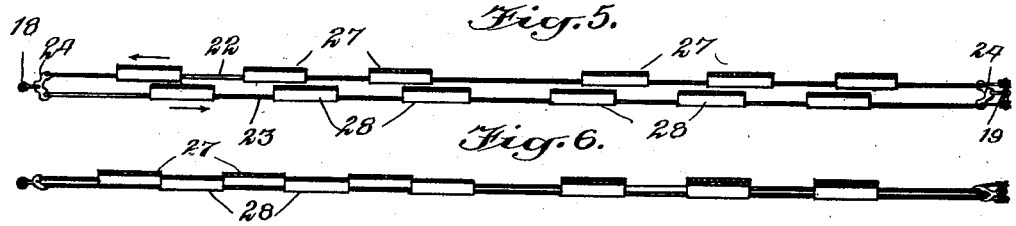
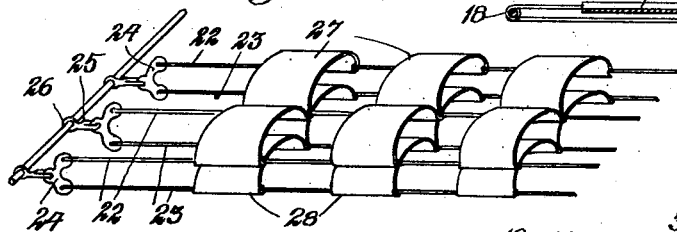
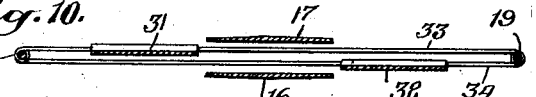
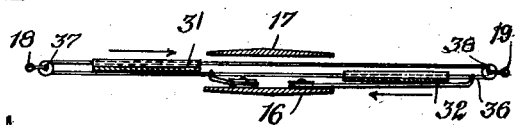
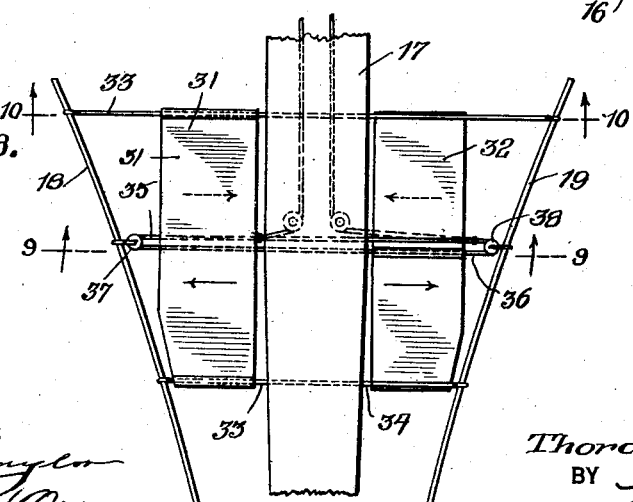
WITNESSES
INVENTOR
Thoralf Borgan
BY
ATTORNEY Patented Jan. 7, 1930

1,743,020

UNITED STATES PATENT OFFICE

THORALF BORGAN, OF BROOKLYN, NEW YORK

AIRPLANE CONSTRUCTION

Application filed January 23, 1929. Serial No. 334,576.

This invention relates to aircraft, and has particular reference to certain improvements in the construction of airplanes.

Primarily, the invention comprehends an improved wing construction which in addition to functioning as a supporting and lifting surface for the craft is designed to allow for vertical descent as well as a gliding descent.

More specifically, the invention comprehends an improved wing construction which is composed of transversely disposed sets of strips spaced fore and aft, in which each of said strips is shaped to present a plurality of contiguous arches or concave-convex portions having the concavity below and the convexity above to function in a capacity similar to that of a number of parachutes.

The invention furthermore comprehends in an airplane wing structure areas having shiftable portions for controlling the lateral and longitudinal balance of the craft, thereby eliminating the use of an elevator or the usual form of ailerons.

The invention further aims to provide a wing structure embodying means for controlling the longitudinal balance of the craft which affords an appreciable greater area for said control than is possible with the usual type of elevator now in general use.

As a further feature, the invention contemplates a wing structure by virtue of which greater stability and more accurate control may be obtained in event of engine failure.

Other objects of the invention reside in the comparative simplicity of construction, the economy of production and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a plan view of an airplane constructed in accordance with the invention.

Figure 2 is a longitudinal sectional view taken approximately on the line indicated at 2—2 in Figure 1.

Figure 3 is a diagrammatic view illustrating the shiftable wing areas and their operating means for controlling the longitudinal and lateral balance of the craft.

Figure 4 is a transverse sectional view taken approximately on the line indicated at 4—4 in Figure 1.

Figure 5 is an enlarged longitudinal sectional view taken approximately on the line indicated at 2—2 in Figure 1, illustrating the sections of the shiftable area in a neutral position.

Figure 6 is a similar view illustrating the sections of the shiftable area for causing the craft to incline upwardly and forwardly.

Figure 7 is a fragmentary perspective view of the shiftable sections and their mounting.

Figure 8 is a fragmentary plan view adjacent one of the wing tips, illustrating the shiftable sections of said area and their mounting.

Figure 9 is a longitudinal sectional view taken approximately on the line 9—9 of Figure 8.

Figure 10 is a similar view taken approximately on the line 10—10 of Figure 8.

Referring to the drawings by characters of reference, 15 designates a fuselage which supports a pair of superposed transverse strut elements 16 and 17 which respectively underlie and overlie the fuselage at their medial portions, the opposite ends of which strut elements are secured together. Transverse fore and aft elements or wires 18 and 19 are attached to the strut terminals and stretched taut and secured medially respectively to the fore and aft ends of the fuselage. Longitudinal elements or wires 20 are secured to and extend from the elements 18 to the elements 19 and the elements or wires 20 have secured thereto the main wing surface or area which consists of a plurality of transverse strips 21 formed of one or more arch shaped or concavo-convex sections which are attached to the longitudinal elements or wires 20 at the extremities of the arch. The strips 21 are also spaced fore and aft to allow for the passage of air therebetween when making a vertical descent. The main wing surfaces are spaced from the fuselage to define an area or areas which are adjustable for controlling the longitudinal balance of the craft, and at this point transversely spaced longitudinally extending wires, cables or similar elements having upper and lower leads 22 and 23 are provided. The opposite ends of the upper and lower leads are attached to the rockers 24 which are fulcrumed as at 25 to mountings 26 attached respectively to the elements 18 and 19. The upper leads have attached thereto the extremities of the arch shaped of concavo-convex members 27 and the lower leads have attached thereto similar members 28. The members 27 and 28 are disposed on the leads 22 and 23 in such a manner that the same may either present a substantially solid forward portion of the area and a spaced apart rear portion of the area or vice versa or an intermediate neutral arrangement by shifting of the upper and lower leads 22 and 23. In order to effect the shifting of the leads 22 and 23, the rockers 24 are connected to control cables 29 which are suitably trained or guided around sheaves 30 and led to the cockpit or pilot's compartment of the craft. It will thus be seen that the area or areas medially of the craft, in addition to forming a part of the lifting surface or wing, may also be controlled to act in the capacity of an elevator and at the same time for controlling the longitudinal balance of the craft in a more effective manner than is possible with the ordinary elevator.

Between the outer ends of the main stationary wing section composed of the strips 21 and the strip of the strut elements 16 and 17, wing tip areas are defined in which are mounted for shifting movement in different vertical planes, a plurality of flat transversely disposed strips 31 and 32. The strips 31 are slidable on upper guides 33 which extend from the elements 18 to the elements 19, while the lower strips 32 are mounted on lower elements or walls 34. The strip 31 is connected to one lead 35 of an endless cable and the strip 32 to the other lead 36 of said endless cable, which cable is trained about sheaves or pulleys 37 and 38 carried respectively by the elements 18 and 19. The strips 31 and 32 of one wing tip area are connected up in such a manner that when said strips are exposed from and in a position fore and aft of the strut elements, the corresponding strips of the other wing tip area are in an overlying position and in a vertical plane coincident with the wing strut elements. Control cables 39 are attached to the cable leads 35 and control cables 40 are attached to the cable leads 36, and said cables 39 and 40 are suitably trained about sheaves or pulleys 41 which lead to the pilot's compartment. It thus follows that the strips 31 and 32 of the wing tip areas may be shifted to control the lateral balance or bank the craft when making a turn so that said strips take the place of the usual ailerons while further presenting an auxiliary lifting and supporting surface combined with the remaining surface of the wing. It should be further understood that the strut elements 16 and 17 enter into and form a part of the planing surface of the aircraft, in addition to acting as supports for the wing areas previously described. In practice, guide wires 42 may be employed to brace the strut elements. It also is apparent that the stationary wing area defined by the strips 21 may be braced by depending connections 43.

What is claimed is:

1. An airplane wing structure composed of transversely disposed sets of contiguous arch shaped strips spaced apart fore and aft and means for balancing the craft fore and aft comprising an area adjacent the inner portion of the wing defined by arch shaped strips relatively shiftable fore and aft to vary the spacing of the front and rear portions of said area.

2. An airplane wing structure composed of transversely disposed sets of contiguous arch shaped strips spaced apart fore and aft, means for balancing the craft fore and aft comprising an area adjacent the inner portion of the wing defined by arch shaped strips relatively shiftable fore and aft to vary the spacing of the front and rear portions of said area and means for controlling the lateral balance of the craft comprising wing tip areas defined by strips mounted for relative movement to respectively balance and unbalance each other.

3. An airplane wing structure composed of transversely disposed sets of contiguous arch shaped strips spaced apart fore and aft, means for balancing the craft fore and aft comprising an area adjacent the inner portion of the wing defined by arch shaped strips relatively shiftable fore and aft to vary the spacing of the front and rear portions of said area, means for controlling the lateral balance of the craft comprising wing tip areas defined by strips mounted for relative movement to respectively balance and unbalance each other and control elements connected with said movable strips and leading to the pilot's compartment.

4. In an airplane including a fuselage, a wing structure composed of a transverse strut centrally connected to the fuselage, elements extending laterally from the opposite ends of the strut to the fore and aft ends of the fuselage, longitudinally disposed parallel elements connected to and extending from the forward and rear lateral elements and transversely disposed strips spaced to present a plurality of contiguous arches spaced apart longitudinally.

5. In an airplane including a fuselage, a wing structure composed of a transverse strut centrally connected to the fuselage, elements extending laterally from the opposite ends of the strut to the fore and aft ends of the fuselage, longitudinally disposed parallel elements connected to and extending from the forward and rear lateral elements, transversely disposed strips spaced to present a plurality of contiguous arches spaced apart longitudinally and means for balancing the craft longitudinally comprising an area of the wing structure adjacent the fuselage having said strips shiftable fore and aft to vary the spacing of the strips of the front and rear portions of said area.

6. In an airplane including a fuselage, a wing structure composed of a transverse strut centrally connected to the fuselage, elements extending laterally from the opposite ends of the strut to the fore and aft ends of the fuselage, longitudinally disposed parallel elements connected to and extending from the forward and rear lateral elements, transversely disposed strips spaced to present a plurality of contiguous arches spaced apart longitudinally and means for balancing the craft longitudinally comprising an area of the wing structure adjacent the fuselage having said strips shiftable fore and aft to vary the spacing of the strips of the front and rear portions of said area, said strips being alternately mounted to move in different vertical planes.

7. In an airplane including a fuselage, a wing structure composed of a transverse strut centrally connected to the fuselage, elements extending laterally from the opposite ends of the strut to the fore and aft ends of the fuselage, longitudinally disposed parallel elements connected to and extending from the forward and rear lateral elements, transversely disposed strips spaced to present a plurality of contiguous arches spaced apart longitudinally and means for controlling the fore and aft and lateral balance of the craft comprising areas defined adjacent the fuselage and at the wing tips in which the strips are mounted for relative movement longitudinally in different vertical planes.

8. In an airplane including a fuselage, a wing structure composed of a transverse strut centrally connected to the fuselage, elements extending laterally from the opposite ends of the strut to the fore and aft ends of the fuselage, longitudinally disposed parallel elements connected to and extending from the forward and rear lateral elements, transversely disposed strips spaced to present a plurality of contiguous arches spaced apart longitudinally and means for controlling the fore and aft and lateral balance of the craft comprising areas defined adjacent the fuselage and at the wing tips in which the strips are mounted for relative movement longitudinally in different vertical planes whereby to increase and decrease relatively portions of said areas.

9. In an airplane including a fuselage, a wing structure composed of a transverse strut centrally connected to the fuselage, elements extending laterally from the opposite ends of the strut to the fore and aft ends of the fuselage, longitudinally disposed parallel elements connected to and extending from the forward and rear lateral elements, transversely disposed strips spaced to present a plurality of contiguous arches spaced apart longitudinally and means for controlling the fore and aft and lateral balance of the craft comprising areas defined adjacent the fuselage and at the wing tips in which the strips are mounted for relative movement longitudinally in different vertical planes whereby to increase and decrease relatively portions of said areas and control elements connected with the shiftable strips and leading to the pilot's compartment of the crafts.

10. In an airplane, a wing constructed of transversely extending strips shaped to present a plurality of contiguous arches, said strips being spaced apart fore and aft to permit a vertical descent, said wing adjacent its medial portion having longitudinal sets of strips movable to selectively underlie each other and to be exposed from each other at longitudinally spaced areas.

11. In an airplane, a wing constructed of transversely extending strips shaped to present a plurality of contiguous arches, said strips being spaced apart fore and aft to permit a vertical descent, said wing adjacent its medial portion having longitudinal sets of strips moveable to selectively underlie each other and to be exposed from each other at longitudinally spaced areas and wing tip areas defined by relatively movable strips for controlling the lateral balance and banking of the craft.

Signed at New York, in the county of New York and State of New York this 22nd day of January, A. D. 1929.

THORALF BORGAN.